United States Patent [19]

Vance

[11] Patent Number: 4,521,030
[45] Date of Patent: Jun. 4, 1985

[54] COLLAPSIBLE AND SLIDABLE CART

[76] Inventor: Jeffrey D. Vance, 7703 24th Ave., N., Hugo, Minn. 55038

[21] Appl. No.: 406,291

[22] Filed: Aug. 9, 1982

[51] Int. Cl.³ .............................................. B62B 1/04
[52] U.S. Cl. ..................................... 280/42; 280/654; 280/47.26; 280/47.29
[58] Field of Search ................. 280/645, 42, 654, 652, 280/47.19, 47.29, 47.28, 47.24, 655, 651, 65 D, DIG. 3, 639, 640, 40, 39, 641

[56] References Cited

U.S. PATENT DOCUMENTS

| | | | |
|---|---|---|---|
| 2,434,998 | 1/1948 | Goldman | 280/42 |
| 2,467,644 | 4/1949 | Wright | 280/29 |
| 2,577,579 | 12/1951 | Hall | 280/645 |
| 2,578,440 | 12/1951 | Meyer | 280/47.24 |
| 2,901,262 | 8/1959 | Berlin | 280/41 |
| 3,191,956 | 6/1965 | Rizzuto | 280/36 |
| 3,276,786 | 10/1966 | Olander | 280/654 |
| 3,788,659 | 1/1974 | Allen | 280/5.24 |
| 3,797,847 | 3/1974 | Lindsey | 280/654 |
| 3,826,511 | 7/1974 | Frank | 280/654 |
| 3,861,695 | 1/1975 | Shourek | 280/5.24 |
| 3,989,295 | 11/1976 | Sparkes | 280/651 |
| 4,275,894 | 6/1981 | Mortenson | 280/5.24 |
| 4,339,141 | 7/1982 | Thiboutot | 280/42 |
| 4,369,987 | 1/1983 | Witherell | 280/42 |

FOREIGN PATENT DOCUMENTS

| | | | |
|---|---|---|---|
| 468495 | 11/1928 | Fed. Rep. of Germany | 280/42 |
| 1509040 | 1/1968 | France | 280/655 |
| 494730 | 5/1954 | Italy | 280/42 |
| 2053102 | 2/1981 | United Kingdom | 280/654 |

Primary Examiner—David M. Mitchell
Attorney, Agent, or Firm—Anthony G. Eggink

[57] ABSTRACT

The collapsible and slidable cart provides for the transport of articles on both horizontal and oblique surfaces. The cart includes a pair of spacially parallel support members, each having a handle portion at the upper end and a wheel mounted for rotation at the lower end. At least one tray member for supporting articles extends outwardly from and is rotationally connected to the support members. Lock means which permit or prevent the rotational movement of the parallel support members relative to the tray member provides the cart user with means to collapse the cart for storage. The parallel support members have a curved, outwardly extending lower end portion so that the wheels extend outwardly from the remaining upper length. The curved lower ends having a low friction contact surface permits the cart to be transported on oblique surfaces, such as stairs. Also provided is a light-weight tubular cart construction which permits tray/support member rotation, as well as a hinged, tray perimeter member which permits the cart to be collapsed into a second configuration. Additionally, handle portion, curved lower portion, tray member, brace member, pouch member, elastic member, brake member, and hinged leg elements or configurations are provided to further enhance the use and function of the collapsible and slidable cart.

20 Claims, 8 Drawing Figures

COLLAPSIBLE AND SLIDABLE CART

This invention relates to a collapsible cart for transporting articles. Particularly, this invention relates to a light-weight, collapsible cart which has wheels for transporting articles on generally horizontal surfaces, which has low friction surfaces positioned to negotiate oblique surfaces, such as stairs, and which, optionally, provides a combination of collapsing or folding configurations.

The increased necessity and popularity of multi-dwelling living, such as in apartment, townhouse, condominium and high-rise buildings, has made it increasingly more difficult for dwellers to transport articles, such as groceries, packages, containers, etc., to and from their living quarters. And, often times the remote location of parking facilities, or the required use of stairs and elevators, has made this transport of articles an even more difficult task.

The decreased amount of storage space inherent in these multi-dwelling buildings, and the increasing use of smaller automobiles, which comparatively have smaller trunks and interior spaces, has further increased the need of a light-weight, easy to assemble, collapsible cart. Consequently, most standard or known carts used for article transport purposes are not well suited to meet these limitations and requirements.

Several types of wheeled carts for transporting articles have been proposed or utilized in the past. However, most carts have been designed for specific uses, such as in grocery stores, for transporting luggage, heavy objects or other large, bulky materials. Consequently, these carts have been complex in design, bulky in construction, and expensive to manufacture.

Still other types of wheeled carts are limited in utility, or are uncapable of being collapsed or folded for storage purposes.

The collapsible and slidable carts of this invention overcome the problems, difficulties and shortcomings of those prior art devices discussed above. The collapsible nature of carts according to this invention permits a cart to be collapsed or folded in a relatively flat configuration for hanging storage in a closet, for example, or to be collapsed or folded into a shorter, compact, less flat configuration for placement into a trunk or into the interior of a compact automobile. Additionally, carts according to the teachings of this invention are simple in design, inexpensive to manufacture, and are quickly and easily assembled by a typical user. Further, the carts of this invention are of a light-weight construction to facilitate transport when not in use for article carrying purposes, and are provided with slidable surface elements to permit the transport of articles up and down oblique walkways, such as stairs, without causing damage to walkway surfaces, such as linoleum, wood, or carpeting.

In summary, this invention provides a collapsible and slidable cart which has wheels, is light-weight in construction, and is designed for easy assembly, multi-storage options, and to transport articles over a variety of typically encountered terrain. The cart includes a pair of elongated, spacially parallel support members, each having a handle portion at the upper end and a wheel mounted for rotation at the lower end. At least one tray member extends outwardly from the pair of support members and is fixed for rotation to each of them. The tray member which can be rigid, is preferably constructed of an elongated, tubular perimeter member having a flexible article supporting surface attached thereto and spanning its area in a generally planar fashion so that articles, such as grocery bags and packages, can be supported and transported thereon. And, a locking means to secure the two parallel support members in a fixed, generally upright position with the tray member in a generally horizontal position therebetween, is also provided.

The cart of this invention provides elongated, tubular support members which are formed at the handle end in a U or C-shaped configuration to facilitate user grasping comfort, and to provide a hanging element to permit the collapsed cart to be hung and stored in a closet, for example.

Also provided by the invention is a tubular support member structure having a curved lower portion so that the wheel mounted therebelow extends forwardly of the remaining upper support member structure. This configuration facilitates the ability of the cart to be slid on the support member structure, above and without obstruction by the wheels, to negotiate such oblique surfaces as stairs. The curved surface of the support member and the surface thereabove is of a smooth, low friction nature, and, preferably, a structural element, such as nylon, teflon or other material having those characteristics is attached at that location on the support member.

The invention additionally provides a locking means which is comprised of at least one brace member for extending between and for lockable fixation to the opposing, parallel support members. Thus, the brace members provide the user with means to secure the cart in a predetermined configuration, such as erected for use, or collapsed for storage or transport. The brace members additionally are preferably located above the tray member or members to provide a backrest, article support element.

Also provided are tray members having formed, upwardly extending, perimeter member portions which provide a forward lip or edge to further secure the articles carried on the article supporting surface. Additionally, even though the mounting for rotation of the perimeter member ends to each support member permits the rotational collapse or folding of the cart, a hinged, intermediate forward portion of the perimeter member permits the collapse or folding of the cart in a more compact configuration.

And, finally provided by the invention is an attachable pouch member to the upper rear portion of a cart to provide for the carrying of smaller articles, such as purses or packages. Also, a movable ground engaging leg mounted to the lower most tray member provides for upright standing support to the cart to facilitate its parking, loading and unloading. A wheel braking member, elongated elastic members disposed between the support members, and other elements are provided to further enhance the use and function of the collapsible and slidable cart of this invention.

These and other benefits of this invention will become clear from the following description by reference to the drawings, wherein.

Figure 1:
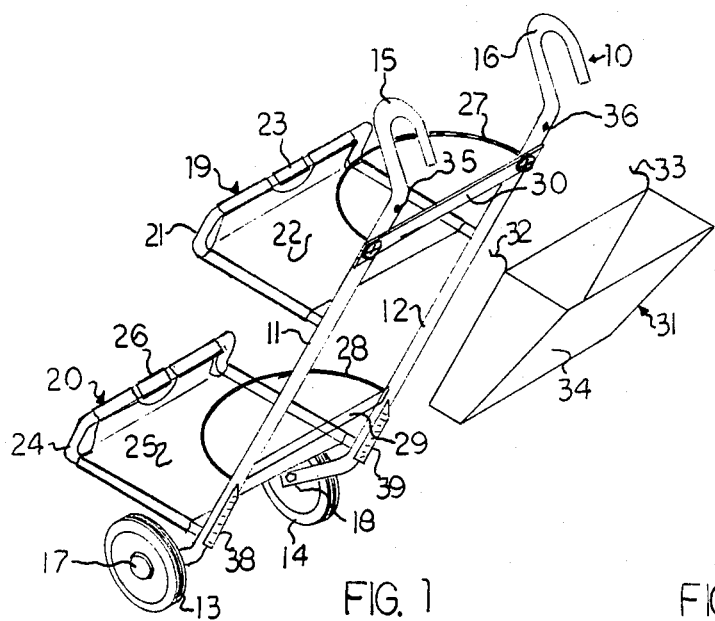
FIG. 1 is a schematic perspective view of the collapsible and slidable cart of this invention shown in an erected, or use, position.

Referring to FIG. 1, a collapsible and slidable cart 10 is shown as having elongated, formed, tubular support members 11 and 12. The support members 11 and 12 are shown having a curved lower portion, at the end of which wheels 13 and 14 are mounted for rotation. The wheels 13 and 14 are standard, light-weight wheels having axles 17 and 18, which are secured to the ends of the support members 11 and 12 by means of the axle extending through, and being bolted to, the lower ends, for example.

Figure 5:
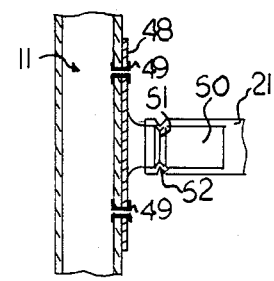
FIG. 5 is a schematic, cut-away view showing the rotational communication between a support member and the tubular perimeter member of a tray.

At the upper ends of the support members 11 and 12 are formed handle portions or members 15 and 16 for grasping by the user to facilitate the pulling or pushing of the cart 10. The handle members 15 and 16 are preferably of a C or U-shaped configuration so that the handle member can also be utilized for storage hanging purposes, as shown in FIG. 5 on bar 44, for example.

Figure 6:
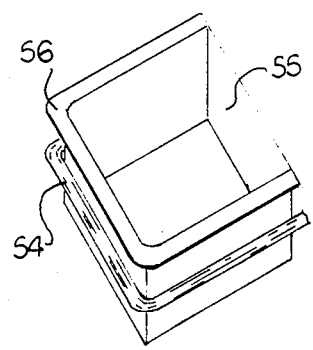
FIG. 6 is a perspective view of an optional configuration of a tray member which utilizes a perimeter member and a rigid, lipped basket for placement therein.

The cart 10 has at least one tray member extending generally outwardly in a forward direction from the two parallel support members 11 and 12. The cart shown in FIG. 1 has two such tray members 19 and 20, the upper and lower, respectively. The tray members 19 and 20, shown in FIG. 1, further have perimeter members 21 and 24 which are generally outwardly extending U-shaped members which define a generally planar area for article support. However, it should be noted that the frontal portions of the perimeter members extend upward, or perpendicular to the planar area, to provide a frontal edge for containing the articles onto the article support surfaces 22 and 25. These support surfaces 22 and 25 are generally flexible in nature and are attached to and span the respective perimeter members 21 and 24. It should also be noted that optionally, depending upon cart use and requirement, the support surfaces 22 and 25 can be rigid in nature, for example to support heavier objects or objects which are desired to be stationary. Additionally, FIG. 6 illustrates a tray member configuration which utilizes a perimeter member 54, which is flat, to receive a rigid basket 55 having a lip 56. The latter configuration will facilitate the transport of small articles, for example, and provides a removable basket for other use.

The tray members 19 and 20 are mounted for rotation to the support members to provide collapsing means for the cart 10, as will be described. The mounting detail is illustrated in FIG. 5 with respect to perimeter member 21 to support member 11. This mounting method can likewise be utilized for other tray member constructions.

A plate 48 is fastened to support member 11 by means of rivets 49. And, a perpendicularly extending post 50 is attached to this plate 48. Further, a circumferential ring 51 extends into the post member 50. The tubular end of perimeter member 21 fits about post 50 and an internally extending ring 52 matingly protrudes into the ring 51 for securing the perimeter member 21 to the post 50, while permitting the rotation of the perimeter member 21 about the post 50. It is this rotational motion which permits the cart to be collapsed.

Figure 7:
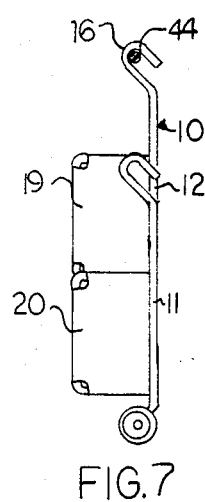
FIG. 7 is a lateral plan view of the collapsible and slidable cart of this invention in its elongated, flat collapsed position; and, FIG. 8 is a frontal plan view of the collapsible and slidable cart of this invention being placed in the second collapsible position.
Figure 8:
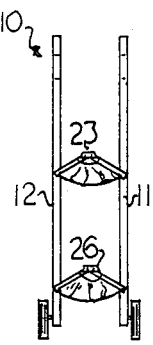

Additionally, hinge members 23 and 26 located at perimeter members 21 and 24 permit the perimeter members themselves to collapse in an upward, vertical direction, as shown in FIG. 8. The first collapsing structure, mentioned above, is illustrated in FIG. 7. The collapsed or folded structure of FIG. 7 provides an elongated structure which is flat and best suited for closet hanging storage, as shown with respect to bar 44. The second collapsed or folded configuration, as shown in FIG. 8, is shorter in length and best suited for automobile trunk or interior compartment storage. It should be mentioned, however, that a cart according to this invention can be provided with either or both of these collapsing features so as to provide various collapsing or folding alternatives.

The cart 10 additionally has locking means to fix the cart in an upright position, for example, by preventing the rotation of the perimeter member end relative to the post extending from the support member. One locking means structure is shown in the drawings as brace members 29 and 30 which are elongated rigid members that are lockable to support members 11 and 12 by means of elements 42, 43 and 40, 41, respectively. These elements are threaded bolt structures which extend from the support members, for example, and which receive a lock washer/internally threaded knob structure to tighten the brace members subsequent to the placement of the bolt through a matching aperture. However, the locking means can consist of any known structure which would prevent the rotation of the tray member relative to the support members.

Preferably, the brace member is positioned above each tray member so as to provide a back rest for articles placed on the respective tray member. The brace members also can be attached to the support structure in an X-configuration, and it is not necessary that each connective rotational point be lockable in nature as long as the cart 10 can be erected in a stable, upright manner. For example, only one side of the brace member may be lockable so that the brace member remains attached to one support member as the opposite threaded knob/washer structure is loosened or removed.

Additionally, a pair of elastic chord members 27 and 28 are provided for use with the tray members 19 and 20 to engage articles, such as grocery bags, placed on the trays and to thereby further secure these articles. The chord members 27 and 28 can be slidably mounted to the respective support members for vertical motion thereon, or they can be attached to hooks attached to the support members.

Figure 2:
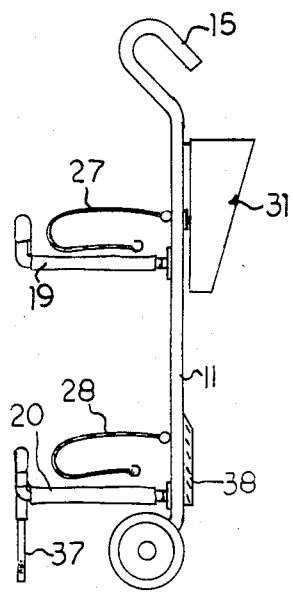
FIG. 2 is a lateral plan view of the collapsible and slidable cart of this invention, and which is shown utilizing the pouch member and the hinged leg element for upright, erected support of the cart.
Figure 3:
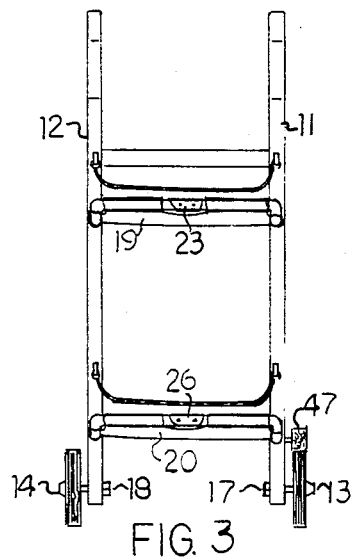
FIG. 3 is a frontal plan view of the collapsible and slidable cart of this invention having a wheel braking element attached to one support member.

A removable pouch member 31 having an exterior surface 34 and a pair of outwardly extending, generally S-shaped members for engaging apertures 35 and 36 of the support members 11 and 12, is shown in FIGS. 1 and 2. The pouch member is removable for cart collapsing purposes, and it is designed to carry purses, small packages, and the like. The S-shaped or attachment members 32 and 33 permit the pouch member 31 to be quickly mountable and removable from the cart 10. The exterior surface 34 can be either a rigid or flexible construction. However, with respect to the latter, an appropriate frame member (not shown) would be necessary, and the attachment members could, in that case, be the ends of that frame member.

Also shown in FIG. 2, and extending downwardly from the lower tray member 20 is a rotatable, leg support member 37. This leg support 37, attached to the perimeter member of the tray, provides cart 10 with a balancing leg to permit its upright standing for the loading and unloading of articles onto and from the tray members. The leg support member is preferably rotatable and lockable in two positions, fully extended and at rest against the bottom of the tray. Additionally, it is preferable to have one such leg support member on either outside corner pf the lower tray member. If one such member is utilized, however, it is prefered that it be located at a generally central outside position of the perimeter member so as to provide maximum stability to the upright cart. It is also possible, although not shown, to have a third wheel mounted for rotation at the frontal bottom portion of the lowermost tray member.

Figure 4:
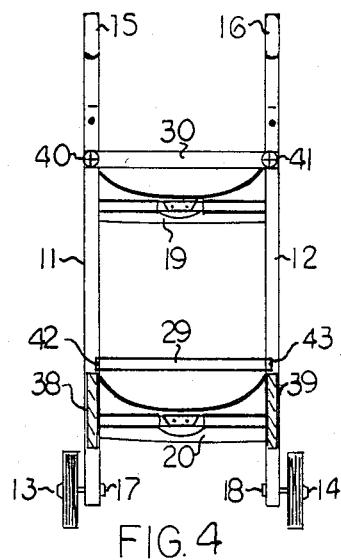
FIG. 4 is a rear plan view of the cart, without the brake element, shown in FIG. 3.

Importantly, as shown in FIGS. 1, 2 and 4, a slidable surface 38 and 39 is provided at the lower portion of each support member 11 and 12. This smooth, low friction surface permits the cart to be negotiated on oblique surfaces, such as stairs, without causing damage to the stair surface, such as wood or carpeting material. The surfaces 38 and 39 can be either smooth exterior surfaces of the support members themselves, such as chrome plating or a teflon coating for example, or they can be separate nylon or other low friction synthetic structural elements that are attached to the interior, lower surface of the respective support members. In either case, the slidable surface should preferably extend from below the curved bottom portion of the support member and then upward.

As indicated above, the cart 10 is preferably light-weight in construction, primarily for transport and handling purposes. The use of aluminum tubing, having a ¾ inch diameter for use as the support members has been found suitable for one cart construction. Additionally, a flexible cloth material, nylon or other synthetic material, for use as tray and pouch covering material and structure has also been found suitable. Dimensionally, a cart being approximately 40 inches high and having a width of about 17 inches with trays about 12 inches deep, has been found adequate for most article transport purposes, for example the transport of grocery bags, having two bags per tray. However, obviously other uses for the cart would require dimensions and structural elements, as required.

The wheels of cart 10 are preferably mounted to the exterior of the support members for stability, and they should preferably extend outwardly from the bottom curved portions to permit the cart to be slidable on members 38 and 39 when negotiating stairs, or the like.

As many changes are possible to the embodiments of this invention, utilizing the teachings thereof, the description above and the accompanying drawings, should be viewed in the illustrative and not in the limited sense.

That which is claimed is:

1. A collapsible cart for transporting articles having at least two wheels, at least one article supporting surface and being collapsible for storage, said cart comprising:
    a. two generally spacially parallel support members, each having a handle portion for gripping at its upper end and a wheel mounted for rotation at its lower end, said two parallel support members being of a light-weight, tubular construction and each having a tubular post member with an indented ring portion intermediate its length extending generally perpendicularly therefrom,
    b. at least one tray member for supporting articles, said tray member extending forward and outwardly from said spacially parallel support members and being attached for rotation to the post member extending from each said support member, said tray member further comprising an elongated tubular perimeter member having an indented circular wall structure at its opposite ends for receiving and for the mating rotational movement with the indented ring portions of said post members, and,
    c. means to lock said two parallel support members in a fixed and predetermined spacially parallel configuration by controlling the rotational movement of said perimeter member of said tray member relative to said support members, whereby, a user by operating said lock means can place said cart in either a configuration of use by fixing said tray member generally in a horizontal position or in a configuration for storage by rotationally collapsing the tray member of said cart.

2. The collapsible cart of claim 1, wherein each said parallel support member has relative to its upper handle member, a curved, outwardly extending, lower end so that said mounted wheel is disposed outwardly from generally the remaining length of said support member, whereby said cart is slidably transportable on said curved lower ends for article transport on oblique surfaces, such as stairs.

3. The collapsible cart of claim 2, wherein each said parallel support member has a low friction surface member disposed at and above said lower end curve at its convex side for facilitating the slidable transport of said cart.

4. The collapsible cart of claim 3, wherein each said low friction surface member is of a synthetic material construction being mounted to said support member.

5. The collapsible cart of claim 1, wherein said lock means is comprised of at least one brace member for extending between and for lockable fixation to said spacially parallel support members, whereby the unlocked position of said brace member to one said support member permits said cart to be collapsed in a spacially vertical direction.

6. The collapsible cart of claim 5, wherein said brace member is disposed spacially above each said tray member, whereby said brace member additionally serves as a back support for articles placed on said tray member.

7. The collapsible cart of claim 1, wherein said cart additionally has a removable pouch member having attaching means at its upper end, said support members further having at their upper ends means to receive said pouch attaching means.

8. The collapsible cart of claim 1, wherein at least one said support member has a wheel engaging member mounted at its lower end, whereby communication of said wheel engaging member with the wheel inhibits its rotation to prevent movement of said cart.

9. The collapsible cart of claim 1, wherein the lower most tray member has a hinged leg mounted to its bottom at an outward location, whereby the vertical placement of said hinged leg permits said cart to be supported in an upright position by providing ground support contact in conjunction with said wheels.

10. The collapsible cart of claim 1, wherein said parallel support members are further interconnected by an elongated elastic member disposed above said outwardly extending tray member, whereby said elastic member provides a peripheral containment for articles transported on said tray member.

11. The collapsible cart of claim 1, wherein said support member handle portions are of generally U-shaped configurations to provide hanging elements for storage as said cart is in a collapsed position.

12. The collapsible cart of claim 5, wherein said elongated perimeter member has a flexible article supporting surface spanning its outward extension, said perimeter member further having hinge means intermediate its ends for permitting said cart to be collapsed inwardly into a compact configuration.

13. A collapsible cart for transporting articles having at least two wheels, at least one forwardly extending article supporting surface and being collapsible for storage, said cart comprising:
  a. two generally spacially parallel support members, each having a handle portion for gripping at its upper end and a wheel mounted for rotation at its lower end, said two parallel support members being of a light-weight, tubular construction and each having a tubular post member with an indented ring portion intermediate its length extending generally perpendicularly therefrom,
  b. at least one tray member for supporting articles, said tray member extending forward and outwardly from said spacially parallel support members and being attached for rotation to the post member extending from each said support member, said tray member further comprising an elongated tubular perimeter member having an indented circular wall structure at its opposite ends for receiving and for the mating rotational movement with the indented ring portions of said post members, said perimeter member further having hinge means intermediate its ends for permitting the tray member to be collapsed inwardly into a compact configuration, and
  c. means to lock said two parallel support members in a fixed and predetermined spacially parallel configuration by controlling the rotational movement of said perimeter member of said tray member relative to said support members, whereby, a user by operating said lock means can place said cart in either a configuration of use by fixing said tray member generally in a horizontal position or in a configuration for storage by rotationally collapsing the tray member of said cart.

14. The collapsible cart of claim 13, wherein each said parallel support member has, relative its upper handle member, a curved, outwardly extending, lower end so that said mounted wheel is disposed outwardly from generally the remaining length of said support member, whereby said cart is slidably transportable on said curved lower ends for article transport on oblique surfaces, such as stairs.

15. The collapsible cart of claim 14, wherein each said parallel support member has a low friction surface member disposed at and above said lower end curve at its convex side for facilitating the slidable transport of said cart.

16. The collapsible cart of claim 13, wherein said lock means is comprised of at least one brace member for extending between and for lockable fixation to said spacially parallel support members, whereby the unlocked position of said brace member to one said support member permits said cart to be collapsed in a spacially vertical direction.

17. The collapsible cart of claim 16, wherein said brace member is disposed spacially above each said tray member, whereby said brace member additionally serves as a back support for articles placed on said tray member.

18. The collapsible cart of claim 13, wherein said elongated perimeter member has a flexible article supporting surface spanning its outward extension.

19. The collapsible cart of claim 13, wherein said support member handle portions are of a generally U-shaped configuration to provide a means for storing the cart in a hanging position from said handle portion.

20. A collapsible and slidable cart for transporting articles having at least two wheels, at least one forwardly extending article supporting surface and being collapsible for storage, said cart comprising:
  a. two generally spacially parallel support members, each having a handle portion for gripping at its upper end and a wheel mounted for rotation at its lower end, each parallel support member additionally having, relative its upper handle member, a curved, outwardly extending, lower end so that said mounted wheel is disposed outwardly from generally the remaining length of said support member, whereby said cart is slidably transportable on said curved lower ends for article transport on oblique surfaces, said two parallel support members further being of a light-weight, tubular construction and each having a tubular post member with an indented ring portion intermediate its length extending generally perpendicularly therefrom,
  b. at least one tray member for supporting articles, said tray member extending forward and outwardly from said spacially parallel support members and being attached for rotation to the post member extending from each said support member, said tray member further comprising an elongated tubular perimeter member having an indented circular wall structure at its opposite ends for receiving and for the mating rotational movement with the indented ring portions of said post members, and
  c. means to lock said two parallel support members in a fixed and predetermined spacially parallel configuration by controlling the rotational movement of said perimeter member of said tray member relative to said support members, whereby, a user by operating said lock means can place said cart in either a configuration of use by fixing said tray member generally in a horizontal position or in a configuration for storage by rotationally collapsing the tray member of said cart.

* * * * *